(12) United States Patent
Gerber et al.

(10) Patent No.: US 12,296,799 B2
(45) Date of Patent: May 13, 2025

(54) ACTUATOR FOR DRUM BRAKE ASSEMBLY

(71) Applicant: ZF Active Safety US Inc., Livonia, MI (US)

(72) Inventors: Kraig Gerber, Plymouth Township, MI (US); Galus Chelaidite, South Lyon, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 434 days.

(21) Appl. No.: 17/946,079

(22) Filed: Sep. 16, 2022

(65) Prior Publication Data

US 2024/0092331 A1 Mar. 21, 2024

(51) Int. Cl.
| | |
|---|---|
| F16D 51/00 | (2006.01) |
| B60T 13/74 | (2006.01) |
| F16D 51/48 | (2006.01) |
| F16D 65/22 | (2006.01) |
| F16D 121/24 | (2012.01) |
| F16D 125/58 | (2012.01) |

(52) U.S. Cl.
CPC ............ B60T 13/746 (2013.01); F16D 51/48 (2013.01); F16D 65/22 (2013.01); *F16D 2121/24* (2013.01); *F16D 2125/582* (2013.01)

(58) Field of Classification Search
CPC ...... F16D 51/48; F16D 65/22; F16D 2121/24; F16D 2125/40; F16D 2125/405; B60T 13/741
See application file for complete search history.

(56) References Cited

U.S. PATENT DOCUMENTS

| | | | |
|---|---|---|---|
| 11,060,572 B2 | 7/2021 | Barbosa | |
| 2006/0278477 A1* | 12/2006 | Balz | F16D 51/48 188/156 |
| 2013/0087422 A1* | 4/2013 | Park | F16D 65/22 188/325 |
| 2016/0025171 A1* | 1/2016 | Choi | F16D 51/30 188/325 |

(Continued)

FOREIGN PATENT DOCUMENTS

JP 2010249314 A * 11/2010

OTHER PUBLICATIONS

Machine translation of JP-2010249314 (no date).*

*Primary Examiner* — Nicholas J Lane
(74) *Attorney, Agent, or Firm* — Tarolli, Sundheim, Covell & Tummino LLP

(57) ABSTRACT

An electric actuator assembly for a drum brake assembly having a brake drum includes a housing and a gear nut configured for rotation by a motor and provided in the housing. A pin extends longitudinally within the housing and is associated with a first clevis for receiving a first brake shoe. A spindle extends longitudinally within the housing and is aligned with the pin. The spindle has a first threaded connection with a second clevis for receiving a second brake shoe and a second threaded connection with the gear nut. The distance between the first clevis and the second clevis increases in response to rotation of the gear nut to move the brake shoes towards the drake drum. The second clevis is urged towards the first clevis in response to cooling of the brake drum in order to back drive the spindle and gear nut and thereby reduce the distance between the first clevis and second clevis.

18 Claims, 9 Drawing Sheets

(56) References Cited

U.S. PATENT DOCUMENTS

| | | | | |
|---|---|---|---|---|
| 2017/0363164 A1* | 12/2017 | Bach | .................... | F16D 65/563 |
| 2021/0123490 A1* | 4/2021 | Jo | ........................... | F16D 51/22 |
| 2021/0190159 A1* | 6/2021 | Bach | ...................... | F16D 65/56 |
| 2022/0306067 A1* | 9/2022 | Madzgalla | .............. | F16D 65/22 |
| 2023/0249658 A1* | 8/2023 | Wazaki | .................. | B60T 1/067 |
| | | | | 188/328 |

* cited by examiner

ACTUATOR FOR DRUM BRAKE ASSEMBLY

TECHNICAL FIELD

The present invention relates generally to braking systems, and specifically to an actuator for a drum brake assembly.

BACKGROUND

Drum-in-hat brakes are provided on the rear wheels of vehicles in order to a apply a parking brake to the vehicle wheels. The drum-in hat brakes include brake shoes selectively movable away from one another and into engagement with the brake drum to apply braking force to the brake drum via friction pads. To this end, an electric actuator assembly or other electric actuator includes a motor for driving the brake shoes into or out of engagement with the brake drum. The brake shoes are locked in this position to apply and hold the parking brake until released via commands to the electric actuator.

SUMMARY

In one example, an electric actuator assembly for a drum brake assembly having a brake drum includes a housing and a gear nut configured for rotation by a motor and provided in the housing. A pin extends longitudinally within the housing and is associated with a first clevis for receiving a first brake shoe. A spindle extends longitudinally within the housing and is axially aligned with the pin. The spindle has a first threaded connection with a second clevis for receiving a second brake shoe and a second threaded connection with the gear nut. The distance between the first clevis and the second clevis increases in response to rotation of the gear nut to move the brake shoes towards the drake drum. The second clevis is urged towards the first clevis in response to cooling of the brake drum in order to back drive the spindle and gear nut and thereby reduce the distance between the first clevis and second clevis.

In another example, an electric actuator assembly for a drum brake assembly having a brake drum includes a housing and a gear nut configured for rotation by a motor and provided in the housing. A pin extends longitudinally within the housing and is associated with a first clevis for receiving a first brake shoe. A spindle extends longitudinally within the housing and is axially aligned with the pin. The spindle has a first threaded connection with a second clevis for receiving a second brake shoe and a second threaded connection with the gear nut. The first threaded connection is a fast lead connection and the second threaded connection is a high load apply threaded connection. The gear nut is rotatable in a first direction in response to actuation of the motor to increase the distance between the first and second clevis to apply braking force to the brake drum. The second clevis is urged towards the first clevis in response to cooling of the brake drum to rotate the gear nut in a second direction opposite the first direction in order to back drive the spindle and gear nut and thereby reduce the distance between the first clevis and second clevis.

Other objects and advantages and a fuller understanding of the invention will be had from the following detailed description and the accompanying drawings.

DETAILED DESCRIPTION

Figure 1:
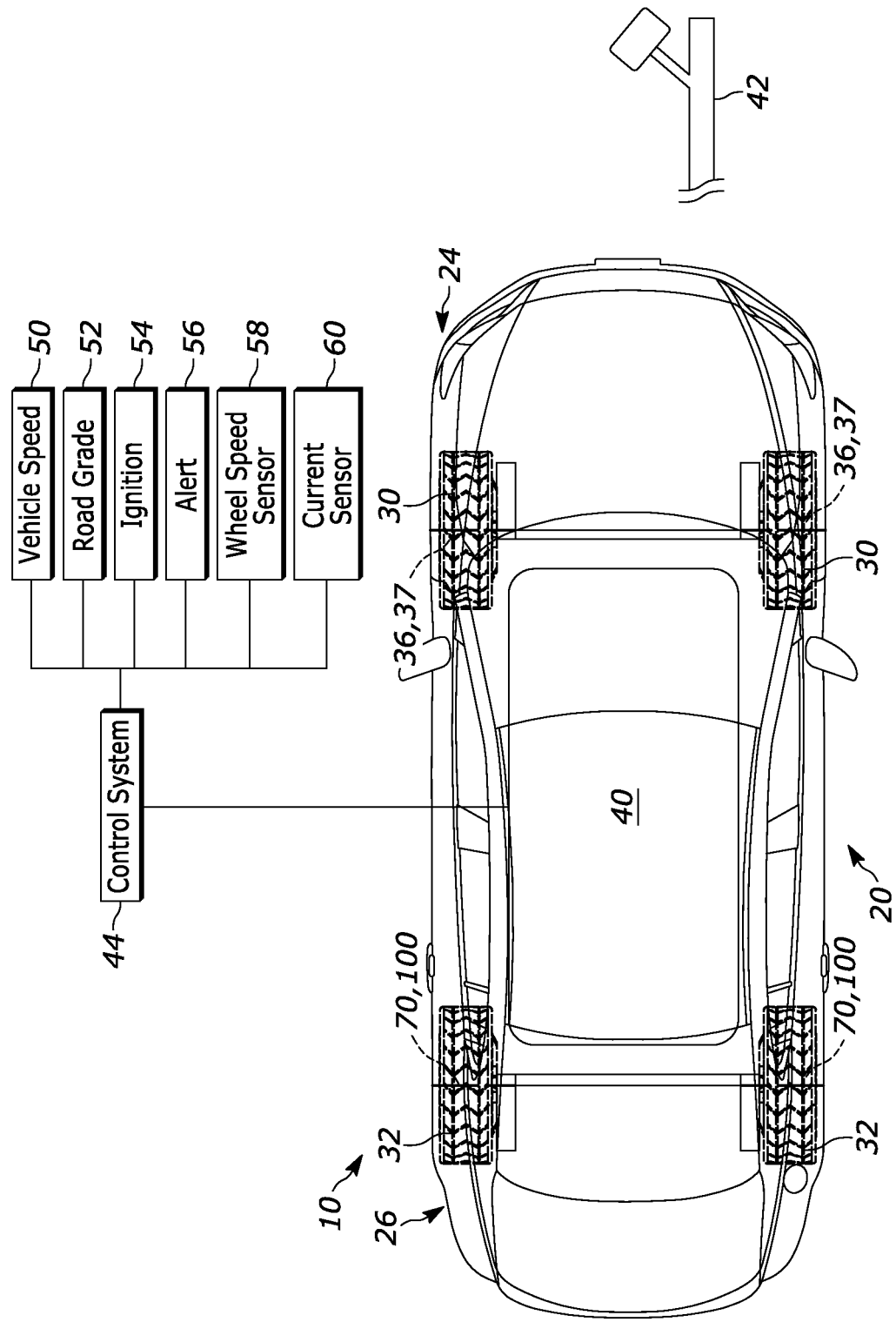
FIG. 1 is a schematic illustration of a vehicle having a drum brake assembly in accordance with an aspect of the present invention.

The present invention relates generally to braking systems, and specifically to an actuator for a drum brake assembly. FIG. 1 illustrates an example electric brake/braking system 10 for a motor vehicle 20 in accordance with the present invention.

The vehicle 20 extends from a first or front end 24 to a second or rear end 26. A pair of steerable wheels 30 is provided at the front end 24. Each wheel 30 includes a wheel rotor 36 driven and steered by a steering linkage (not shown). Disc brakes 37 are associated with each wheel rotor 36. A brake pedal 42 can be used to actuate the disc brakes 37 to apply service braking to the wheels 30.

A pair of steerable or non-steerable wheels 32 is provided at the rear end 26. Each rear wheel 32 includes a wheel rotor 70 driven by a steering linkage (not shown). A drum brake assembly 100, e.g., a drum-in-hat brake assembly, is associated with each rear wheel rotor 70. A propulsion system 40, e.g., an engine and/or battery, supplies torque to the wheels 30.

A control system 44 is provided to help control operation of the vehicle 20, such as operation of the propulsion system 40 and vehicle braking, including operation of the drum brakes assemblies 100. To this end, the control system 44 can include one or more controllers, such as a propulsion system controller, motor controller, and/or brake controller. That said, the control system 44 is connected to and receives signals from various sensors that monitor vehicle functions and environmental conditions.

For example, a vehicle speed/acceleration sensor 50 monitors the vehicle speed and acceleration and generates signals indicative thereof. A road grade sensor 52 can detect or calculate the slope of the road on which the vehicle 20 is driving and generate signals indicative thereof. An ignition sensor 54 generates signals indicative of ignition status. A wheel speed sensor 58 is provided on/adjacent to each wheel 32 and generates signals indicative of the speed at each wheel. The control system 44 also receives signals indicative of the degree—including velocity and acceleration—the brake pedal 42 is depressed.

The control system 44 can receive and interpret these signals and perform vehicle functions, e.g., braking, in response thereto. In one example, the control system 44 can detect wheel slip between one or more wheels 30, 32 and the driving surface based on the sensors 50, 58 and perform anti-lock braking (ABS) and/or electronic stability control (ESC) using one or more disc brakes 37. The control system 44 can also be connected to an alert 56 for notifying the driver/operator of the vehicle 20 of vehicle conditions, vehicle status, braking operations, and/or environmental conditions.

Figure 2:
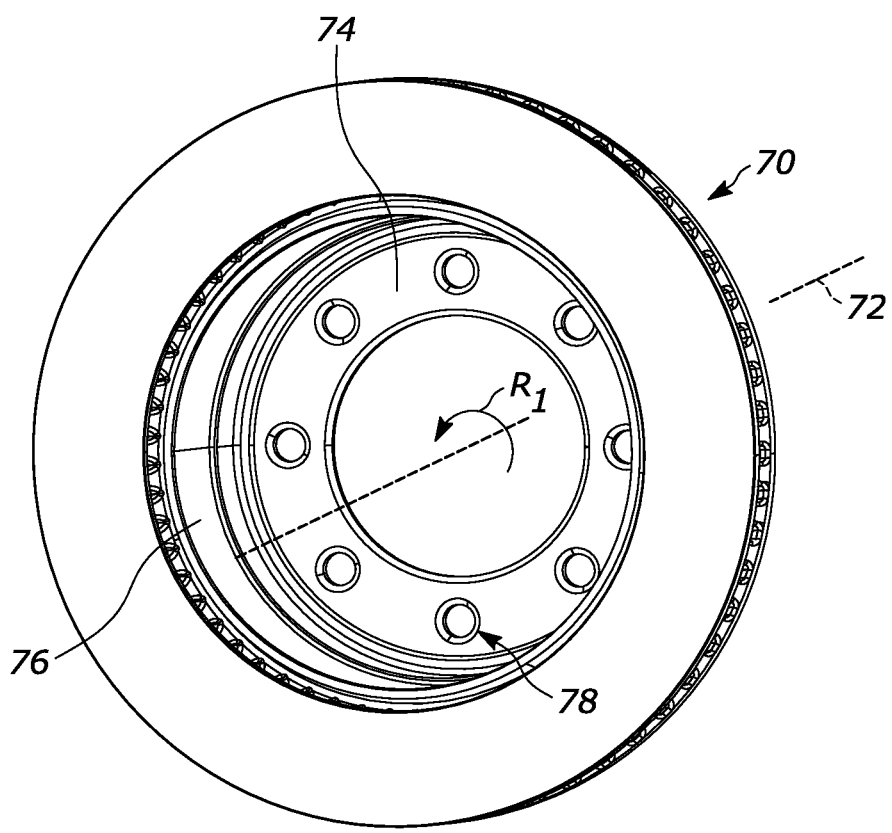
FIG. 2 is a schematic illustration of a drum-in-hat brake rotor of the drum brake assembly.

Referring to FIG. 2, the rotor 70 associated with each rear wheel 32 can be a drum-in-hat rotor centered on an axis 72. To this end, the rotor 70 includes a hat or brake drum 74 having an inner surface 76 configured as a braking surface for interacting with the drum brake assembly 100. Mounting holes 78 in the rotor 70 allow the drum brake assembly 100 to be secured thereto. The direction of rotation of the rotor 70 during normal driving of the vehicle 20 is indicated at R.

Figure 3:
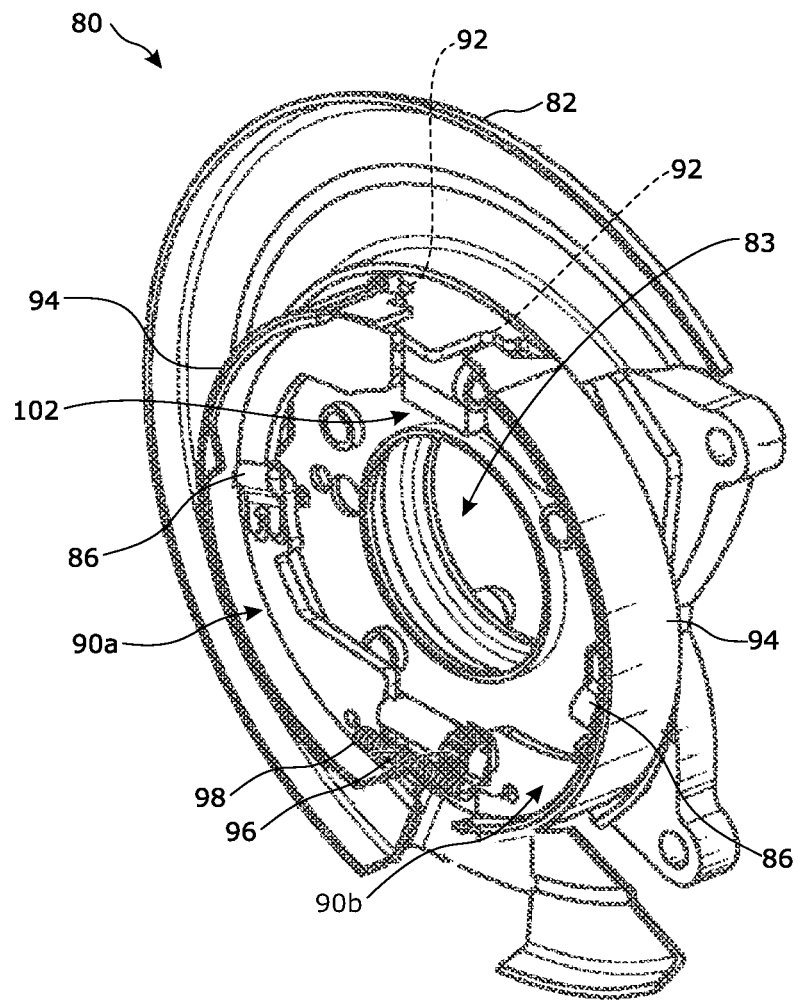
FIG. 3 is schematic illustration of an adapter assembly for the drum brake assembly.
Figure 4:
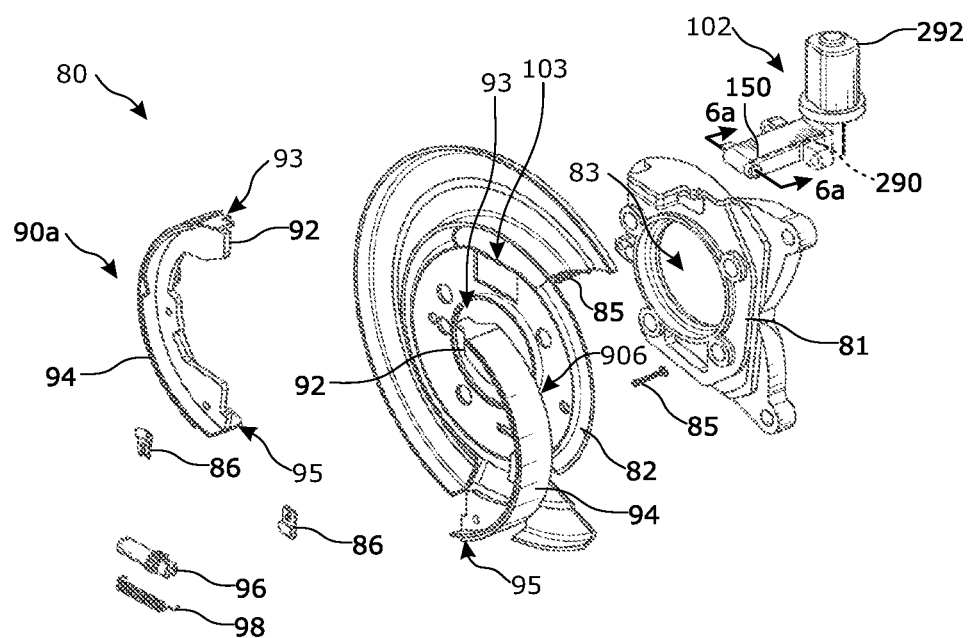
FIG. 4 is an exploded view of the adapter assembly of FIG. 3.
Figure 5:
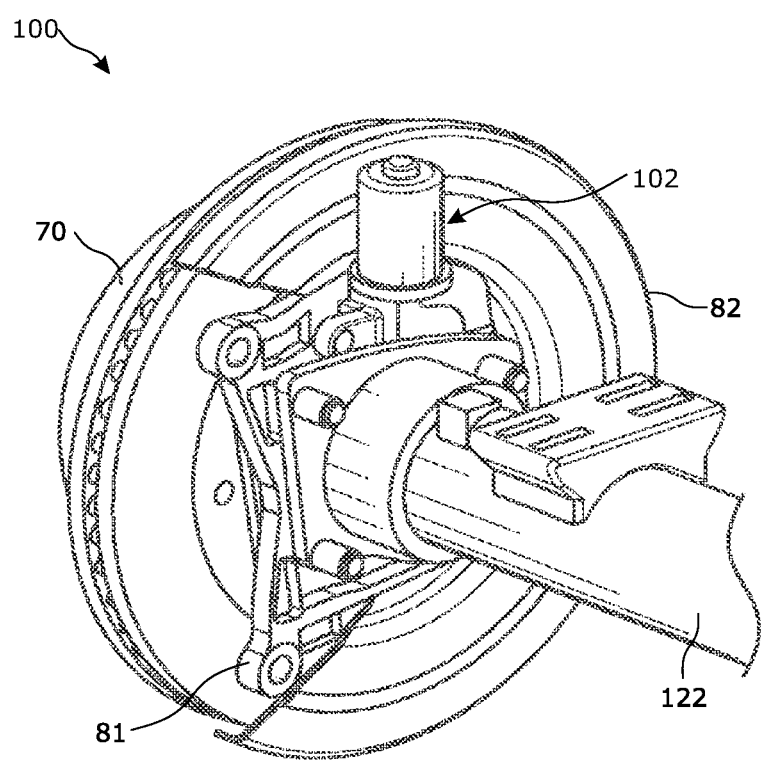
FIG. 5 is a schematic of the adapter assembly connected to the drum-in-hat rotor.

FIGS. 3-5 illustrate an example drum brake assembly 100 and associated electric actuator assembly 102 for selectively applying braking force to the rotor 70. Although this invention will be described and illustrated in connection with the drum brake assembly 100, it will be appreciated that this invention may be used in connection with other vehicle drum brake assemblies, if so desired.

The drum brake assembly 100 and electric actuator assembly 102 are scalable and flexible for usage with vehicles of different sizes and classifications. As non-limiting examples, the drum brake assembly 100 and electric actuator assembly 102 may be scaled for use with different sizes of passenger cars, crossover vehicles, sport utility vehicles, light duty trucks, or heavy duty trucks.

The drum brake assembly 100 includes an adapter assembly 80 (FIGS. 3 and 4) secured to the rotor 70 for acting on the brake drum 74. The adapter assembly 80 includes a central adapter 81 having a central opening 83. A splash shield 82 covers the adapter 81 and extends radially outward therefrom.

A pair of brake shoes 90*a*, 90*b* is mounted to the splash shield 82 on opposite sides of the opening 83. To this end, a hold down pin 85 extends from the splash shield 82 and through each brake shoe 90*a*, 90*b*. A spring 86 is secured to each pin 85 to keep the brake shoes 90*a*, 90*b* slidably secured typically against the splash shield and substantially in the same plane as one another. Each brake shoe 90*a*, 90*b* is generally curved or arcuate and extends circumferentially about opposite sides of the opening 83 in the splash shield 82 between first and second ends 93, 95. The first end 93 of each brake shoe 90*a*, 90*b* includes a planar tab or projection 92.

A friction pad 94 is secured to the outer arcuate surface of each brake shoe 90*a*, 90*b*. The friction pad 94 has the same shape and general contour as the inner surface 76 of the brake drum 74. An adjusting mechanism 96 and return spring 98 are provided between and secured to the second ends 95 of the brake shoes 90*a*, 90*b*.

Turning to FIG. 5, the adapter 81 is rigidly mounted to an axle case 122 associated with the non-steerable wheel 32 at the rear end 26. The electric actuator assembly 102 is a separate, self-contained unit mounted to the drum brake assembly 100, e.g., mounted to the adapter 81 by bolts, screws, etc. In any case, the electric actuator assembly 102 extends through an opening 103 in the splash shield 82 and between the projections 92 of the brake shoes 90*a*, 90*b*.

As will be discussed, the electric actuator assembly 102 is commanded to actuate the brake shoes 90*a*, 90*b* between braking and non-braking positions. In the braking position, the brake shoes 90*a*, 90*b* contact and press against the brake drum 74 to slow or otherwise stop rotation of a wheel (not shown) to which the brake drum is rigidly fixed. In the non-braking position, the brake shoes 90*a*, 90*b* are radially inwardly spaced from the brake drum 74 and thereby allow the wheel to rotate freely.

Figure 6A:
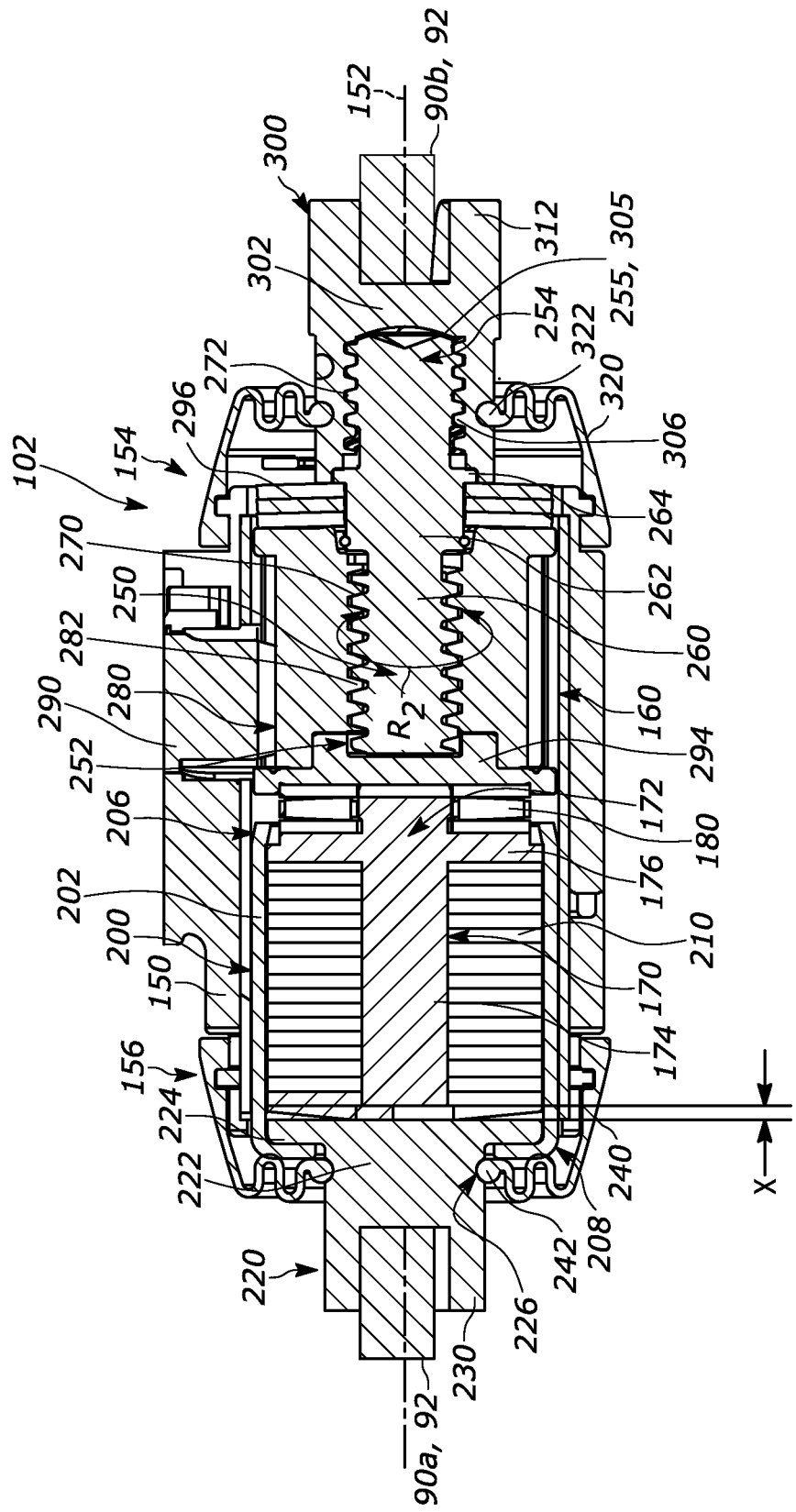
FIG. 6A is a section view of FIG. 4 taken along line 6A-6A illustrating an example actuator assembly in a first condition prior to actuation.

As shown in FIG. 6A, the electric actuator assembly 102 includes a housing 150 extending along a centerline 152 from a first end 154 to a second end 156. A central passage 160 extends the length of the housing 150 and along the centerline 152. A pin 170 and a spindle 250 are provided within the passage 160. The pin 170 includes an end 172. A shaft 174 extends longitudinally from the end 172 towards the first end 154 of the housing 150 but does not exit the housing. A flange 176 extends radially from the shaft 174 adjacent the end 172. A thrust bearing 180 is provided over the end 172 and abuts the flange 176.

A spring pack 200 is provided in the passage 160 and connected to the pin 170. The spring pack 200 includes a hollow cage 202 extending from a first end 206 to a second end 208. Both the first and second ends 206, 208 can be formed as bent or crimped edges extending radially inward towards the centerline 152. A biasing mechanism 210 is provided within the cage 202 and extends over the shaft 174 of the pin 170. In one example, the biasing mechanism 210 is formed as a series of ring-shaped disc springs stacked atop one another. As shown, the disc springs 210 are Belleville washers arranged in stacks opposed to one another, e.g., alternating stacks of three stacked washers. Other biasing mechanisms, such as one or more coil springs and/or blocks of a compressible material are contemplated. In any case, the shaft 174 extends within the biasing mechanism 210 but terminates prior to the longitudinal extent thereof.

A first clevis 220 is provided at the first end 154 of the housing 150 and includes a base 222 and a flange 224 extending radially from the base. A recess 226 extends around the perimeter of the base 222. A receiving member 230, such as a fork, notch, projection, etc., extends from the base 222 opposite the flange 224. The flange 224 extends into the cage 202 and is sandwiched between the bent first end 206 of the cage 202 and the biasing mechanism 210. That said, the biasing mechanism 210 acts on the flange 176 to urge the flange 224 against the cage 202 and longitudinally spaced from the axial extent of the shaft 174, as indicated at X in FIG. 6A. It will be appreciated that the cage 202 can be crimped around the first clevis 220 and the flange 176 to set the pre-load of the biasing mechanism 210, e.g., at about 4500 N.

The base 222 extends out of the first end 154 of the housing 150 such that the receiving member 230 extends away therefrom. A flexible seal 240 is connected to the exterior of the first end 154 of the housing 150 and includes a bead 242 received in the recess 226 on the base 222 to help prevent dirt, water, etc., from entering the first end of the housing.

The spindle 250 extends from a first end 252 positioned within the passage 160 adjacent the head 172 of the pin 170 to a second end 254 extending out of the second end 156 of the housing 150. The spindle 250 includes a shaft 260 extending along the centerline 152. A projection 262 extends radially outward from the shaft 260 between the ends 252, 254 of the spindle 250. An annular flange 264 extends radially outward from the projection 262.

First threads 270 are provided along the shaft 260 from the projection 262 to the first end 252. Second threads 272 are also provided along the shaft 260 at the second end 254 and outside the housing 150. The first and second threads 270, 272 are different from one another. In one example, the first threads 270 function as both high load apply threads as well as self-locking threads. The second threads 272 are fast lead threads.

A gear nut 280 is also provided within the passage 160 and encircles the shaft 260 of the spindle 250. The gear nut 280 includes teeth 282 threadably engaged with the first threads 270 on the spindle 250 that cooperate to act as self-locking threads, e.g., the threads 270, 282 cannot be back driven. The gear nut 280 is also threadably connected to a gear train 290 driven by a motor 292 (see FIG. 4).

An adapter 294 connected to the end of the gear nut 280 abuts the thrust bearing 180. A return spring 296 extends around the projection 262 and is sandwiched between the flange 264 on the projection 262 and the end of the gear nut 280.

A second clevis 300 is connected to the second end 254 of the spindle 250. The second clevis 300 includes a base 302 and a blind passage 304 extending into the base. Threads 306 are provided along the blind passage 304. The threads 306 on the second clevis 300 are configured to mate with the second threads 272 on the shaft 260. It will be appreciated that the mating threads 272, 306 can be configured to be "fast lead" threads. That is to say, the threads 272, 306 can be configured to have mating fast-lead constructions that facilitate back-drive between the spindle 250 and the second clevis 300.

A recess 310 extends around the perimeter of the base 302. A receiving member 312, such as a fork, notch, projection, etc., extends from the base 302 opposite the blind passage 304. A flexible seal 320 is connected to the exterior of the second end 156 of the housing 150 and includes a bead 322 received in the recess 310 on the base 302 to help prevent dirt, water, etc., from entering the second end of the housing.

When the electric actuator assembly 102 is connected to the drum brake assembly 100, the tab 92 on the first end 93 of the brake shoe 90a is received by the receiving member 230 of the first clevis 220. The tab 90 on the first end 93 of the brake shoe 90b is received by the receiving member 312 on the second clevis 300. Any number of mating connections or interfaces, e.g., a clevis-type interface, U-shaped, T-shaped, tongue-in-groove, etc., can be used to couple the first and second clevis members 220, 300 on the electric actuator assembly 102 to the respective brake shoes 90a, 90b.

The spindle 250 and second clevis 300 are connected together such that the second end 254 of the spindle extends the entire length or substantially the entire length of the blind passage 304. To this end, an axial extent 255 of the second end 254 abuts a corresponding end surface 305 near the end of the blind passage 304, as shown in FIG. 6A. That said, the length of the threaded blind passage 304 defines the maximum degree to which the spindle 250 and second clevis 300 can move relative to one another along the centerline 152.

During operation of the vehicle 20, the driver can apply the parking brake, e.g., either mechanically with a lever or electronically by pushing a button. The control system 44 can receive signals from one or more of the sensors, e.g., the brake pedal 42, vehicle speed sensor 50, road grade sensor 52 and/or wheel speed sensor 58, and determine that actuating the parking brake is appropriate.

In response, the control system 44 actuates the electric actuator assembly 102 associated with each rear wheel 32. More specifically, the control system 44 actuates the motor 292 in the electric actuator assembly 102 (FIG. 5). The gear train 290 transmits torque from the motor 292 to the gear nut 280, causing the gear nut to rotate about the centerline 152 in the direction $R_2$, as shown in FIG. 6A. The return spring 296 applies a compressive force between the cooperating self-locking threads 270, 282 on the spindle 250 and the gear nut 280, respectively, and, thus, the spindle 250 rotates with the gear nut 280 in the direction $R_2$.

At the same time, the second clevis 300, having the threaded connection 272, 306 with the spindle 250, attempts to rotate about the centerline 152 with the spindle 250 but is prevented from rotating by the tip 92 of the brake shoe 90b. More specifically, the brake shoe 90b connection to the adapter 81 prevents rotation of the brake shoe about the centerline 152. That said, rotating the spindle 250 in the manner $R_2$ while preventing the second clevis 300 from rotating causes the second clevis to move longitudinally away from the spindle 250 in the manner $D_1$.

Figure 6B:
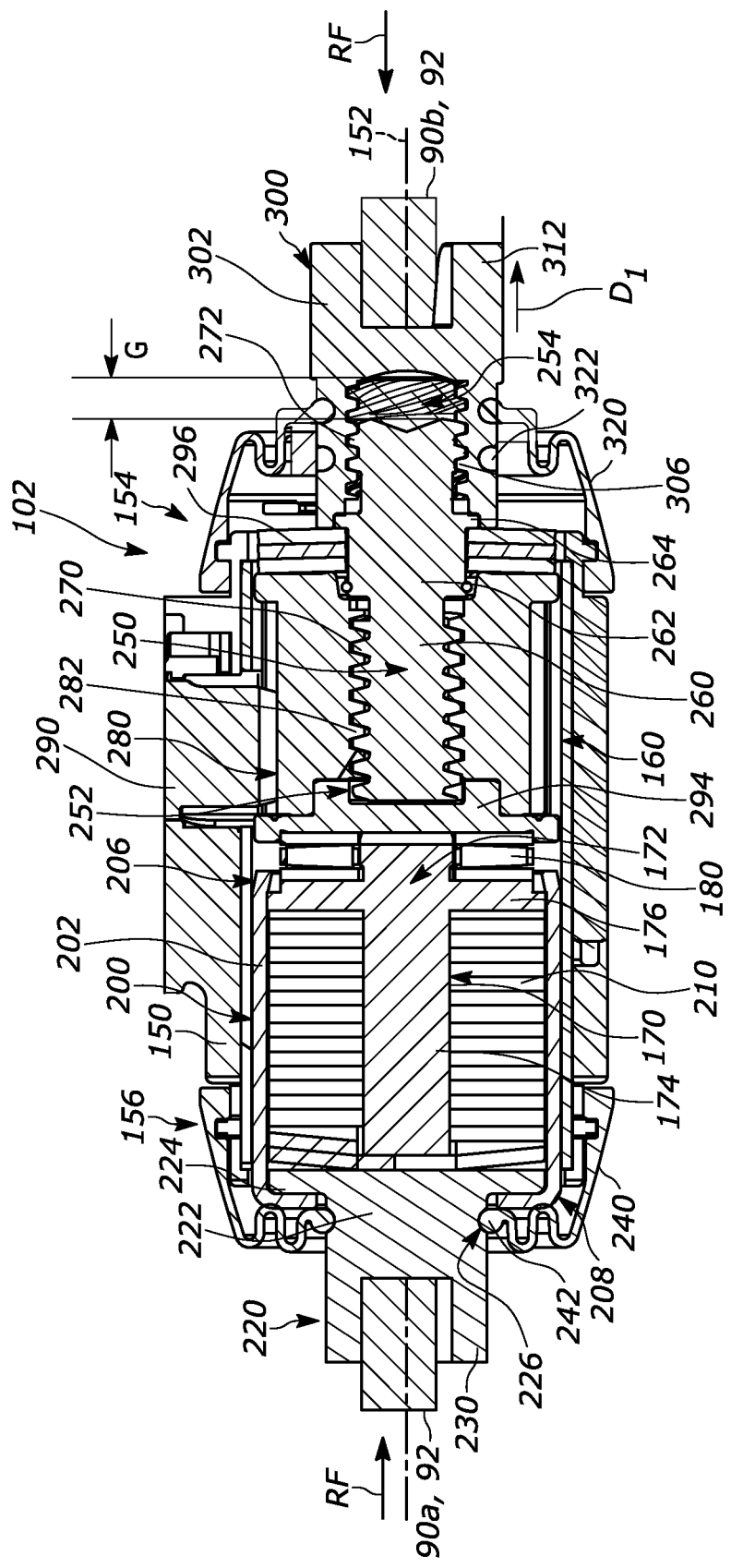
FIG. 6B illustrates the actuator assembly of FIG. 6A in a second condition during braking.

Based on this construction, a gap G is formed between the surfaces 255, 305, as illustrated in FIG. 6B. Consequently, the overall length of the electric actuator assembly 102 along the centerline 152 increases. To this end, the distance between the first and second clevis 220, 300 increases. Since the first and second clevis 220, 300 are respectively connected to the tips 92 on the brake shoes 90a, 90b, this necessarily urges the brake shoes away from one another and towards the inner surface 76 of the brake drum 70.

The brake shoes 90a, 90b are initially spaced from the inner surface 76 and, thus, there is little to no initial resistance to outward movement of the brake shoes towards the inner surface 76. Ultimately, each brake shoe 90a, 90b pivots outward about the adjuster 96 until the friction pad 106 engages the inner surface 76 of the brake drum 74 to apply braking force thereto. This engagement corresponds with the gap G having a predetermined value of, for example, about 2.5 mm. Engagement between the brake shoes 90a, 90b and the inner surface 76 produces reaction forces RF on the first and second clevis 220, 300.

Once the gap G reaches the predetermined value two things occur. First, additional rotation of the gear nut 280 does not cause the gear nut and spindle 250 to rotate together in the manner $R_2$. Rather, the gear nut 280 rotates in the manner $R_2$ while the spindle 250 translates with the second clevis 300 in the direction $D_1$. The gap G remains at the predetermined value, i.e., there is no relative movement between the spindle 250 and the second clevis 300. As a result, the brake force applied by the brake shoes 90a, 90b to the inner surface 76 continues to increase until reaching a predetermined amount.

Figure 6C:
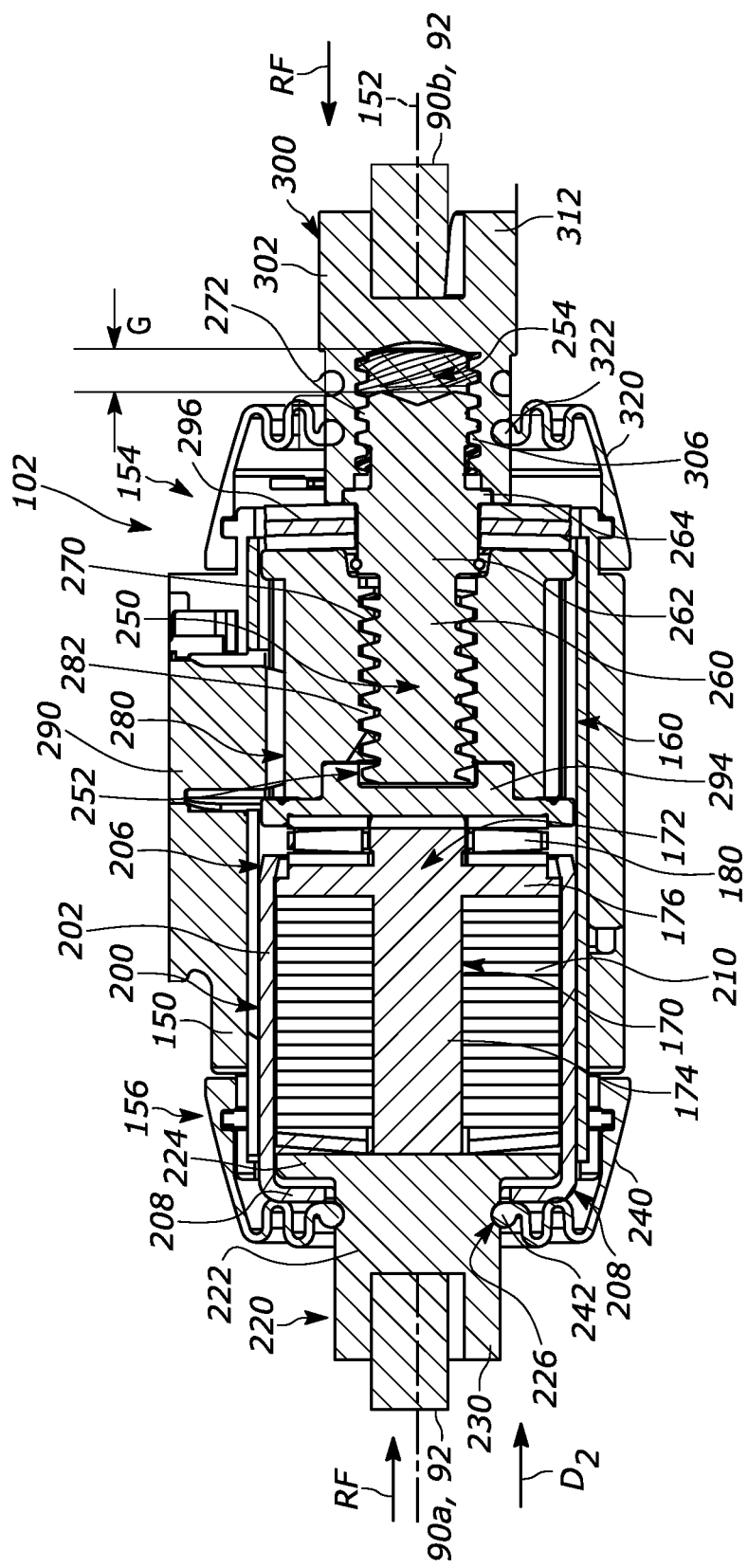
FIG. 6C illustrates the actuator assembly of FIG. 6A in a third condition during braking.

When this occurs, the reaction forces RF are sufficient to overcome the bias of the biasing mechanism 210. Consequently, and referring to FIG. 6C, the first clevis 220 is moved along the centerline 152 relative to the cage 202 and towards the shaft 174 in the direction $D_2$. In other words, the spring pack 200 is deflected/compressed by the reaction force F, thereby shrinking the distance X. The maximum deflection is limited to the initial distance X before the brake operation is initiated. That said, the shaft 174 acts as a hard stop to longitudinal movement of the first clevis 220. Although FIG. 6C illustrates the distance X being reduced to zero, it will be appreciated that the spring pack 200 could be compressed a lesser degree than illustrated such that the distance X is between zero and the amount shown in FIG. 6B.

The electric actuator assembly 102 is actuated to rotate the gear nut 280 until the current draw thereon reaches a predetermined value, at which point the electric actuator assembly is turned off. The current draw can be measured and monitored by a current sensor 60 (see also FIG. 1) connected to the electric actuator assembly 102 and the control system 44. Turning the electric actuator assembly 102 off locks both the first and second clevis 220, 300 in position and therefore locks the brake shoes 90a, 90b in the braking condition applying the parking brake force to the inner surface 76. The brake drum 74, in turn, exerts the aforementioned reaction forces RF on the brake shoes 90a, 90b. The reaction forces RF are transferred from the friction pads 94, through the tips 92 of each brake shoe 90a, 90b, and ultimately to the first and second clevis 220, 300. Consequently, the locked first and second clevis 220, 300 oppose the reaction forces RF applied by the brake drum 74 to the brake shoes 90a, 90b.

Depending on the driving and/or braking conditions, the brake drum 74 can undergo thermal expansion during application of the parking brake. As a result, the longitudinal travel distance of the second clevis 220 increases to accommodate the extra clearance needed to reach the inner surface 76. That said, once the parking brake is applied and the vehicle 20 exited, the brake drum 74 naturally begins to cool. More specifically, the inner surface 76 of the brake drum 74 contracts towards the brake shoes 90a, 90b and electric actuator assembly 102. This can undesirably increase reaction forces RF borne by the locked first and second clevis 220, 300.

Figure 6D:
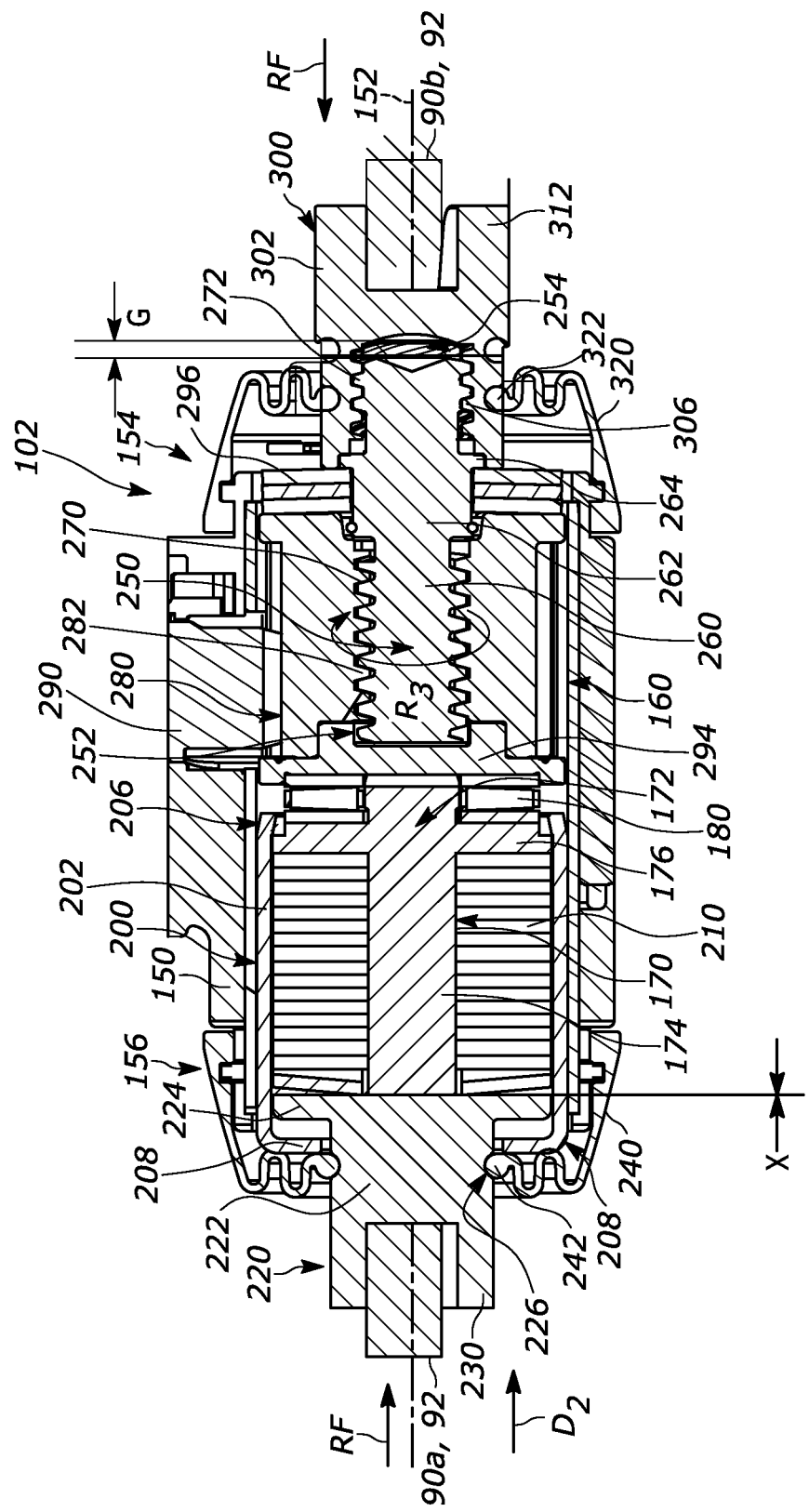
FIG. 6D illustrates the actuator assembly of FIG. 6A in a fourth condition during brake drum contraction.

With this in mind, the electric actuator assembly 102 of the present invention is specifically configured to automatically take up/absorb these reaction forces and prevent undesirable stress on the electric actuator assembly during thermal contraction of the brake drum 74. To this end, and referring to FIG. 6D, the forces experienced by the fast lead threaded connection 272, 306 increase as the brake drum 74 cools. When the reaction forces RF reach or exceed a predetermined amount, the fast least connection 272, 306 generates sufficient backdrive torque to force the self-locked spindle 250 and gear nut 280 to rotate together through the high load thread connection 270, 282 in the direction $R_3$ about the centerline 152. The direction $R_3$ is opposite the direction $R_2$ and, thus, this rotation causes the gear train 290 to back drive the motor 292.

When the spindle 250 is backdriven, the second clevis 300 (which cannot rotate) moves longitudinally in the direction $D_3$ towards the spindle, thereby reducing the gap G. Consequently, the overall length of the electric actuator assembly 102 along the centerline 152 is decreased to accommodate the shrinking/cooling brake drum 74. The reaction forces RF are therefore automatically reduced to thereby lower the stress applied to the electric actuator assembly 102.

When the parking brake is released, the control system 44 activates the electric actuator assembly 102 to retract the second clevis 300 completely until the gap G returns to zero or substantially zero. Since the reaction forces RF are removed the biasing mechanism 210 automatically returns the first clevis 220 to its initial position abutting the cage 220. The brake shoes 90a, 90b are therefore also returned to their initial positions spaced from the brake drum 74. The return spring 98 facilitates this return.

The adjusting mechanism 96 is lengthened in a known manner, e.g., automatically or manually, as the friction pads 94 wear down to maintain a substantially constant radial spacing between the brake shoes 90a, 90b and the inner surface 76 prior to actuating the brakes. Consequently, the travel length of the second clevis 300 for each brake application is substantially maintained as the friction pads 106 go through their service life.

The present invention is advantageous in that it allows the electric actuator assembly to automatically account for the shrinking brake drum and thereby help reduce unwanted stress on its components. While conventional spring packs have a limited ability to accommodate the shrinking brake drum, the advantageous, threaded connection between the spindle and second clevis shown and described herein can be specifically tailored to allow for a prescribed amount of relative movement therebetween, e.g., by defining the extents of the gap, to occur at a prescribed amount of reaction force, e.g., by designing the fast lead threaded connection between the spindle and second clevis accordingly.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An electric actuator assembly for a drum brake assembly having a brake drum, comprising:
   a housing;
   a gear nut configured for rotation by a motor and provided in the housing;
   a pin extending longitudinally within the housing and associated with a first clevis for receiving a first brake shoe; and
   a spindle extending longitudinally within the housing and aligned with the pin, the spindle having a first threaded connection with a second clevis for receiving a second brake shoe and a second threaded connection with the gear nut, wherein the distance between the first clevis and the second clevis increases in response to rotation of the gear nut to move the brake shoes towards the drake drum, the second clevis being urged towards the first clevis in response to cooling of the brake drum in order to back drive the spindle and gear nut and thereby reduce the distance between the first clevis and second clevis.

2. The electric actuator assembly recited in claim 1, wherein the distance between the first and second clevis is increased during braking by longitudinally advancing the second clevis relative to the spindle along the first threaded connection.

3. The electric actuator assembly recited in claim 1, wherein the first threaded connection between the spindle and the second clevis is a fast lead connection.

4. The electric actuator assembly recited in claim 1, wherein the spindle is rotatable by the gear nut to move the second clevis away from the first clevis to apply braking force to the brake drum.

5. The electric actuator assembly recited in claim 1, wherein the spindle rotates with the gear nut until a predetermined force on the second threaded connection is reached and rotates relative to the gear nut when the predetermined force is exceeded.

6. The electric actuator assembly recited in claim 5, wherein a biasing mechanism biases the first clevis away from the pin.

7. The electric actuator assembly recited in claim 6, wherein the first clevis is moved against the bias towards the pin in response to reaction forces applied by the drum brake to the first clevis when the spindle translates relative to the gear nut.

8. The electric actuator assembly recited in claim 7, wherein the biasing mechanism comprises stacked disc springs.

9. The electric actuator assembly recited in claim 7, wherein the first clevis is movable against the biasing mechanism into engagement with an end of the pin such that the pin acts as a hard stop.

10. The electric actuator assembly recited in claim 1, wherein the gear nut is rotatable in a first direction in response to actuation of the motor to apply braking force to the brake drum and rotatable in a second direction opposite the first direction in response to cooling of the brake drum when the motor is unactuated.

11. An electric actuator assembly for a drum brake assembly having a brake drum, comprising:
   a housing;
   a gear nut configured for rotation by a motor and provided in the housing;
   a pin extending longitudinally within the housing and associated with a first clevis for receiving a first brake shoe; and
   a spindle extending longitudinally within the housing and aligned with the pin, the spindle having a first threaded connection with a second clevis for receiving a second brake shoe and a second threaded connection with the gear nut, the first threaded connection being a fast lead connection and the second threaded connection being a high load apply threaded connection,
   wherein the gear nut is rotatable in a first direction in response to actuation of the motor to increase the distance between the first and second clevis to apply braking force to the brake drum, the second clevis being urged towards the first clevis in response to cooling of the brake drum to rotate the gear nut in a second direction opposite the first direction in order to back drive the spindle and gear nut and thereby reduce the distance between the first clevis and second clevis.

12. The electric actuator assembly recited in claim 1, wherein the distance between the first and second clevis is increased during braking by longitudinally advancing the second clevis relative to the spindle along the first threaded connection.

13. The electric actuator assembly recited in claim 1, wherein the spindle is rotatable by the gear nut to move the second clevis away from the first clevis to apply braking force to the brake drum.

14. The electric actuator assembly recited in claim 1, wherein the spindle rotates with the gear nut until a predetermined force on the second threaded connection is reached and rotates relative to the gear nut when the predetermined force is exceeded.

15. The electric actuator assembly recited in claim 14, wherein a biasing mechanism biases the first clevis away from the pin.

16. The electric actuator assembly recited in claim 15, wherein the first clevis is moved against the bias towards the pin in response to reaction forces applied by the drum brake to the first clevis when the spindle translates relative to the gear nut.

17. The electric actuator assembly recited in claim 16, wherein the biasing mechanism comprises stacked disc springs.

18. The electric actuator assembly recited in claim 16, wherein the first clevis is movable against the biasing mechanism into engagement with an end of the pin such that the pin acts as a hard stop.

* * * * *